US010972512B2

(12) United States Patent
Joshi et al.

(10) Patent No.: US 10,972,512 B2
(45) Date of Patent: Apr. 6, 2021

(54) SYSTEM AND METHOD FOR IDENTIFYING IDLE RESOURCES IN COMMUNICATION ENDPOINTS

(71) Applicant: Avaya Inc., Santa Clara, CA (US)

(72) Inventors: Vivek Joshi, Pune (IN); Abhishek Gupta, Pune (IN); Dhananjay Shende, Pune (IN)

(73) Assignee: Avaya Inc., Santa Clara, CA (US)

( * ) Notice: Subject to any disclaimer, the term of this patent is extended or adjusted under 35 U.S.C. 154(b) by 125 days.

(21) Appl. No.: 16/040,456

(22) Filed: Jul. 19, 2018

(65) Prior Publication Data

US 2020/0028882 A1 Jan. 23, 2020

(51) Int. Cl.
*H04L 29/06* (2006.01)

(52) U.S. Cl.
CPC ...... *H04L 65/1069* (2013.01); *H04L 65/1006* (2013.01); *H04L 65/1083* (2013.01); *H04L 65/608* (2013.01)

(58) Field of Classification Search
CPC ............. H04L 65/1006; H04L 65/1069; H04L 65/1046; H04L 65/1083; H04L 65/608
See application file for complete search history.

(56) References Cited

U.S. PATENT DOCUMENTS

| 7,580,510 | B2 | 8/2009 | Poustchi et al. |
| 7,796,520 | B2 | 9/2010 | Poustchi et al. |
| 8,411,669 | B2 | 4/2013 | Chen et al. |
| 9,521,169 | B2 * | 12/2016 | Braudes ............... H04L 65/1083 |
| 10,129,898 | B2 * | 11/2018 | Seo ........................ H04W 72/02 |

OTHER PUBLICATIONS

Rosenberg et al. "SIP: Session Initiation Protocol," Network Working Group, Jun. 2002, RFC 3261, 252 pages.
Ravindranath et al. "DTLS-SRTP Handling in SIP Back-to-Back User Agents," Internet Engineering Task Force (IETF), May 2016, RFC 7879, 13 pages.

* cited by examiner

*Primary Examiner* — Zhensheng Zhang
(74) *Attorney, Agent, or Firm* — Sheridan Ross P.C.

(57) ABSTRACT

A request to establish a communication session between a first communication endpoint to a second communication endpoint is received. A determination is made that the request to establish the communication session requires an application to be inserted into the communication session between the first communication endpoint and the second communication endpoint. For example, the application may be a call recording application. A first processing resource in a first idle communication endpoint is selected based on an idleness factor of the first processing resource. The application is sent to the first idle communication endpoint. The application in the first idle communication endpoint is then inserted into the communication session between the first communication endpoint and the second communication endpoint.

19 Claims, 8 Drawing Sheets

SYSTEM AND METHOD FOR IDENTIFYING IDLE RESOURCES IN COMMUNICATION ENDPOINTS

BACKGROUND

Communication endpoints (e.g., hardwired telephones) in many communication systems typically lie idle most of the time. For example, in a corporate environment, communication endpoints in the main and in branch locations are usually idle because the communication endpoints are only being used when a voice call occurs. Additionally, branch locations may have to deploy a media server that can be very expensive in spite of having so many processing resources in the communication endpoints that are not being utilized.

SUMMARY

These and other needs are addressed by the various embodiments and configurations of the present disclosure. A request to establish a communication session between a first communication endpoint to a second communication endpoint is received. A determination is made that the request to establish the communication session requires an application to be inserted into the communication session between the first communication endpoint and the second communication endpoint. For example, the application may be a call recording application. A first processing resource in a first idle communication endpoint is selected based on an idleness factor of the first processing resource. The application is sent to the first idle communication endpoint. The application in the first idle communication endpoint is then inserted into the communication session between the first communication endpoint and the second communication endpoint.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "Session Initiation Protocol" (SIP) as used herein refers to an IETF-defined signaling protocol, widely used for controlling multimedia communication sessions such as voice and video calls over Internet Protocol (IP). The protocol can be used for creating, modifying and terminating two-party (unicast) or multiparty (multicast) sessions consisting of one or several media streams. The modification can involve changing addresses or ports, inviting more participants, and adding or deleting media streams. Other feasible application examples include video conferencing, streaming multimedia distribution, instant messaging, presence information, file transfer and online games. SIP is as described in RFC 3261, available from the Internet Engineering Task Force (IETF) Network Working Group, November 2000; likewise, SIP RFC 7897 entitled "DTLS-SRTP Handling in SIP Back-to-Back User Agents," May 2016 describes how to sequence applications (Back-to-Back User Agents) into a communication session; these documents, and all other SIP RFCs describing SIP are hereby incorporated by reference in their entirety for all that they teach.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
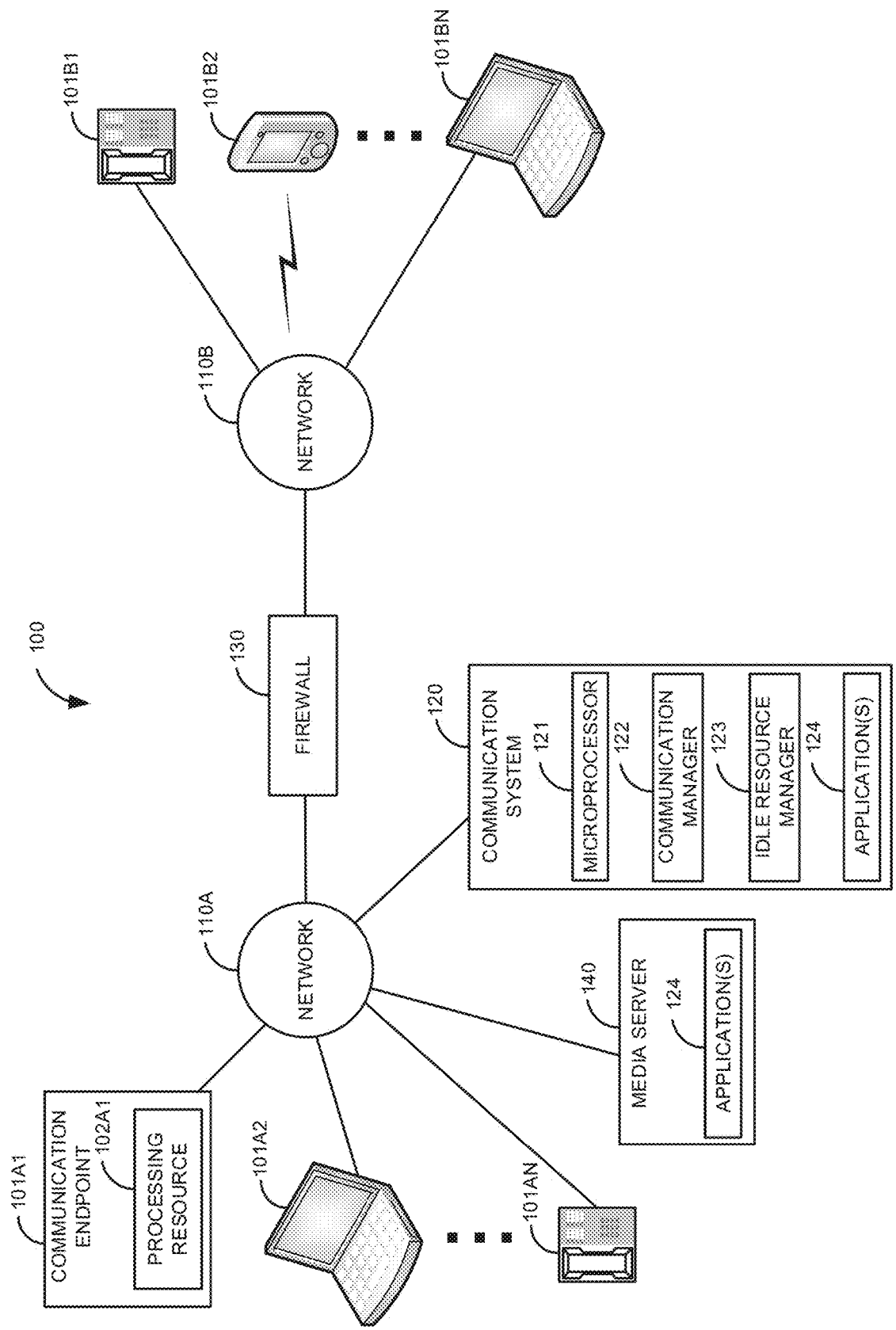
FIG. 1 is a block diagram of a first illustrative system for identifying idle communication endpoints in order to better utilize processing resources of the idle communication endpoints.

FIG. 1 is a block diagram of a first illustrative system 100 for identifying idle communication endpoints 101 in order to better utilize processing resources 102 of the idle communication endpoints 101. The first illustrative system 100 comprises communication endpoints 101A1-101AN, communication endpoints 101B1-101BN, networks 110A-110B, a communication system 120, a firewall 130, and a media server 140.

The communication endpoints 101A1-101AN/101B1-101BN can be or may include any communication endpoint device that can communicate on the networks 110A/110B, such as a Personal Computer (PC), a telephone (e.g., a hard wired desktop telephone), an audio conferencing system, a video phone (e.g., a hardwired video phone), a video conferencing system, a cellular telephone, a Personal Digital Assistant (PDA), a tablet device, a notebook device, a smart phone, and/or the like. In one embodiment, the communication endpoint devices 101A1-101AN are limited to hard-wired telephones.

The communication endpoints 101A-101N/101B1-101BN are devices where a communication session terminates. The communication endpoints 101A-101N are not network elements that facilitate and/or relay a communication session in the networks 110A/110B, such as a communication manager 122, a router, a media server 140, a firewall 130, and/or the like.

The communication endpoint 101A1 is shown to include a processing resource 102A1. Although not shown for simplicity, the communication endpoints 101A2-101AN/101B1-101BN will also comprise processing resources 102A2-102AN/102B1-102BN. The processing resource 102 may comprise elements such as, a microprocessor, a Digital Signaling Processor (DSP), a multi-core processor, a microcontroller, an application specific processor, and/or the like. The processing resource 102 may also include other types of processing resources 102, such as, a memory, disk space, a memory controller, and/or other hardware/software elements that are part of the processing resource 102 of the communication endpoint 101.

The processing resource 102 in the communication endpoints 101 may be mostly idle, partially idle, or not idle. For example, a desktop telephone (or videophone) is typically mostly idle until a user picks up the telephone, which causes the telephone to go off-hook and become non-idle. Alternatively, a desktop computer may be partially idle. For example, one or more cores of a multicore processor may be mostly idle and available for use while other cores may be fully utilized. Alternatively, each core may be partially idle and a total idleness score for the communication endpoint 101 may be based on an overall percentage of idleness of the multiple cores or for each individual core. Depending on the idleness of each core, multiple applications 124 may executed by each core.

Idleness of a processing resource 102 can be based on a percentage of CPU/memory usage compared a total CPU/memory usage. Idleness may be based on memory that is internal (e.g., a cache in a microprocessor) and/or external (e.g. Random Access Memory/Flash Memory). For example, a desktop telephone may have a CPU/memory usage of 10% (considered idle) when not in use and a CPU/memory usage of 95% when in use (not available).

The networks 110A-110B can be or may include any collection of communication equipment that can send and receive electronic communications, such as, the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The networks 110A-110B can use a variety of electronic protocols, such as Ethernet, Internet Protocol (IP), Session Initiation Protocol (SIP), Integrated Services Digital Network (ISDN), and the like. Thus, the networks 110A-110B are an electronic communication networks configured to carry messages via packets and/or circuit switched communications.

In FIG. 1, the network 110A is typically associated with a group or organization. For example, the network 110A may be a corporate network. The network 110B is typically a public network such as the Internet/PSTN that can be used to establish communication sessions (e.g., voice or video communication sessions) between the communication endpoints 101A1-101AN and the communication endpoints 101B1-101BN via the communication system 120.

The communication system 120 can be or may include any hardware coupled with software that can manage communication sessions between the communication endpoints 101A1-101AN/101B1-101BN, such as a Private Branch Exchange (PBX), a session manager, a communication manager 122, an Automatic Call Distributor (ACD), a central office switch, a router and/or the like. The communication system 120 further comprise a microprocessor 121, a communication manager 122, an idle resource manager 123, and application(s) 124.

The microprocessor 121 can be any known microprocessor 121, such as, a multi-core processor, a microcontroller, an application specific processor, an Integrated Circuit (IC) chip, a collection of IC chips, a DSP and/or the like. The processor 121 may include, but is not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The communication manager 122 can be or may include any hardware coupled with software that can manage communication sessions in the communication system 120, such as a PBX, a session manager, an ACD, a router, and/or the like. The communication manager 122 can manage various types of communications sessions, such as voice communication sessions, video communication sessions, Instant Messaging (IM) communication sessions, email communication sessions, text messaging communication sessions, social media communication sessions, virtual reality communication sessions, and/or the like. In one embodiment, the communication manager 122 may only manage voice and/or video communication sessions.

The idle resource manager 123 can be any software that can determine if a processing resource 102 in a communication endpoint 101 is idle. For example, an idle communication endpoint 101 may be a communication endpoint 101 that is below a processing threshold. The idle resource manager 123 can determine if a processing resource 102 in a communication endpoint 101 is going to be idle using various mechanisms.

The idle resource manager 123 can determine other relevant factors to determine a best idle communication endpoint 101, such as a processing capacity of a communication endpoint 101, a location of an idle communication endpoint 101 relative to other communication endpoints 101 involved in a communication session, and/or the like.

The application(s) 124 can be or may include any software module that can be inserted into a communication session, such as call recording application, a call disconnection application, a call transfer application, a call forking application, a billing application, a protocol adaption application, an Interactive Voice Response (IVR) application, a ring tone generation application, a call progress application, a SIP Back-to-Back User Agent (B2BUA), and/or the like.

The firewall 130 can be or may include any hardware coupled with software that can provide firewall services, such as a network address translator, a packet filtering firewall, a circuit level gateway, a state inspection firewall, an application gateway, a session border controller, a deep packet inspection firewall, and/or the like. The firewall 130 provides protection services for the network 110A. In one embodiment, the firewall 130 is not included.

The media server 140 can be or may include any hardware coupled with software that can insert one or more applications 124 into a communication session. The media server 140 is an optional element in FIG. 1. In one embodiment, the system of detecting idle communication endpoints 101 is based on the media server 140 failing. The media server 140 further comprises the applications 124.

Figure 2:
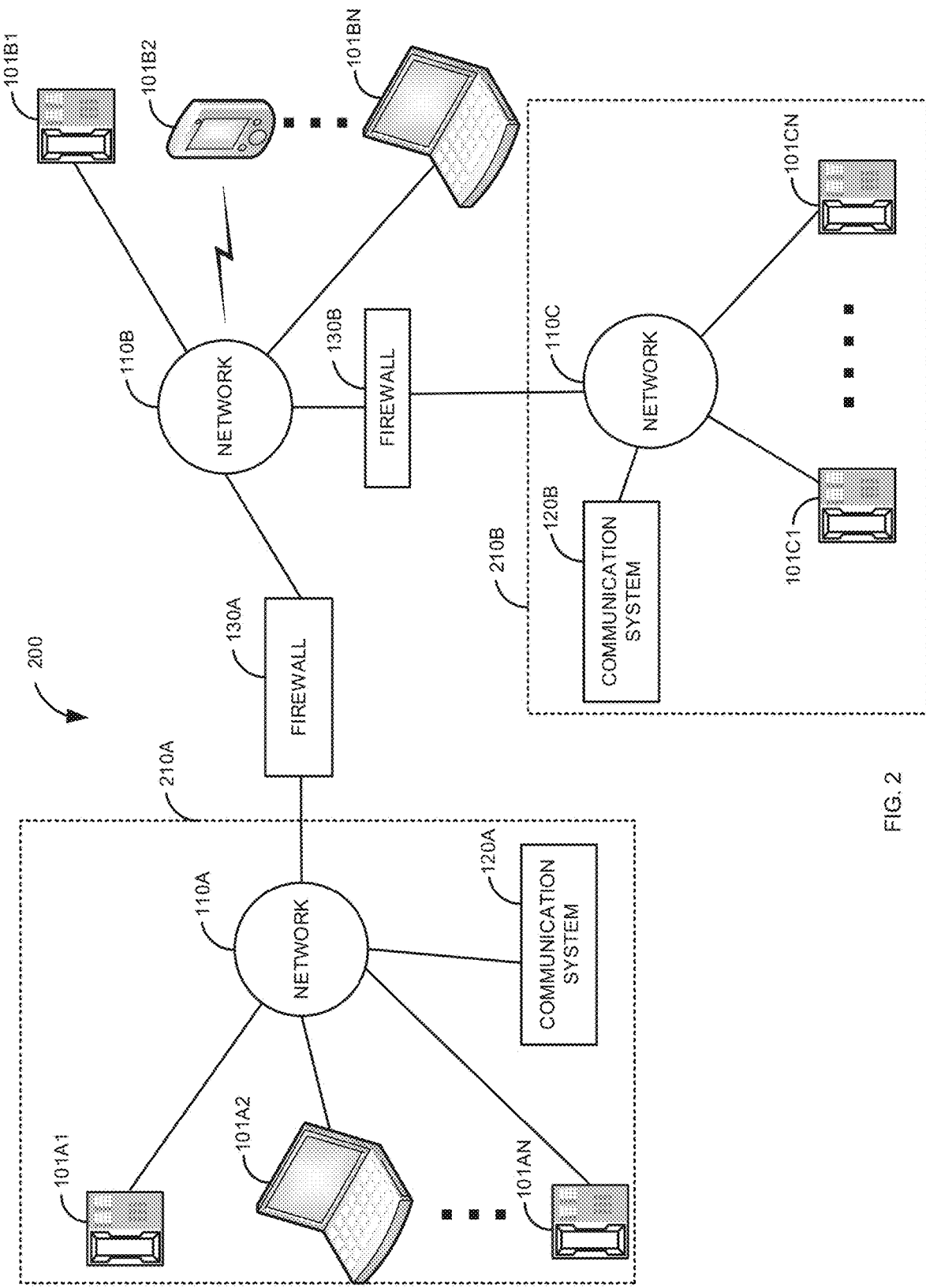
FIG. 2 is a block diagram of a second illustrative system for identifying idle communication endpoints in order to better utilize processing resources of the idle communication endpoints in a distributed computer network.

FIG. 2 is a block diagram of a second illustrative system 200 for identifying idle communication endpoints 101 in order to better utilize processing resources 102 of the idle communication endpoints 101 in a distributed computer network 110. The second illustrative system 200 comprises the communication endpoints 101A1-101AN, the communication endpoints 101B1-101BN, communication endpoints 101C1-101CN, networks 110A-110C, communication systems 120A-120B, firewalls 130A-130B, and branch networks 210A-210B.

The branch locations 210A-210B are computer networks for branches locations of an organization, such as, branch locations 210A-210N of a corporation. The branch location 210A comprises the communication endpoints 101A1-101AN, the network 110A, and the communication system 120A. The branch location 210B comprise the communication endpoints 101C1-101CN, the network 110C, and the communication system 120B. Because the branch locations 210A-210B are networks 110A/110C for the same entity, the communication systems 120A-120B may communicate information between each other, such as, information on whether the communication devices 101A1-101AN/101C1/101CN are idle.

Figure 3:
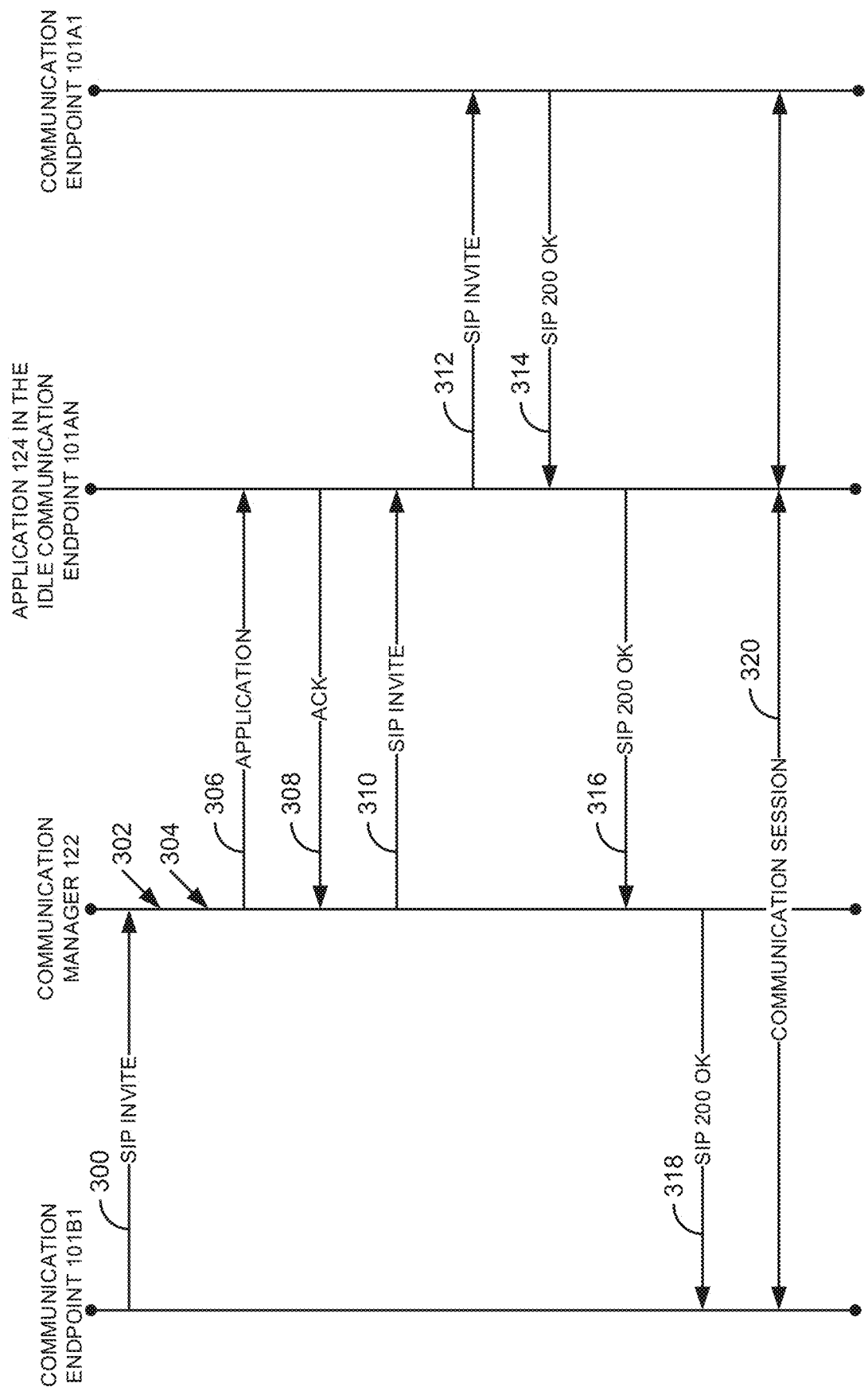
FIG. 3 is a flow diagram of a process for identifying and utilizing idle communication endpoints by inserting an application in an idle communication endpoint into a communication session.

FIG. 3 is a flow diagram of a process for identifying and utilizing idle communication endpoints 101 by inserting an application 124 in an idle communication endpoint 101 into a communication session. Illustratively, the communication endpoints 101A1-101AN, 101B1-101BN, and 101C1-101CN, the processing resources 102, the communication systems 120A-120B, the communication manager 122, the idle resource manager 123, the application(s) 124, the firewalls 130A-130B, and the media server 140 are stored-program-controlled entities, such as a computer or microprocessor 121, which performs the method of FIGS. 3-8 and the processes described herein by executing program instructions stored in a computer readable storage medium, such as a memory (i.e., a computer memory, a hard disk, and/or the like). Although the methods described in FIGS. 3-8 are shown in a specific order, one of skill in the art would recognize that the steps in FIGS. 3-8 may be implemented in different orders and/or be implemented in a multi-threaded environment. Moreover, various steps may be omitted or added based on implementation.

FIG. 3 is an exemplary example that uses SIP to establish the communication session. However, one of skill in the art would recognize that other protocols (e.g., Web Real-Time Communication (Web RTC) protocol, H.323, video protocols, etc.) may be used. The process of FIG. 3 is where there is not a media server 140 or where the media server 140 has failed.

The communication endpoint 101B1 sends a SIP INVITE message (a request) to establish a communication session with the communication endpoint 101A1, in step 300. The communication manger 122 receives the SIP INVITE message of step 300. The idle resource manager 123 determines, in step 302, if the request to establish the communication session (the SIP INVITE message of step 300) requires an application 124 to be inserted into the communication session between the communication endpoint 101A1 and the communication endpoint 101B1. In step 302, the determination may that there is always an application 124 to be inserted into the communication session. If there is not an application 124 to be inserted into the communication session or if an idle processing resource 102 is not available, the communication session is established by sending the SIP INVITE message of step 300 directly to the communication endpoint 101A1 (not shown).

Figure 4:
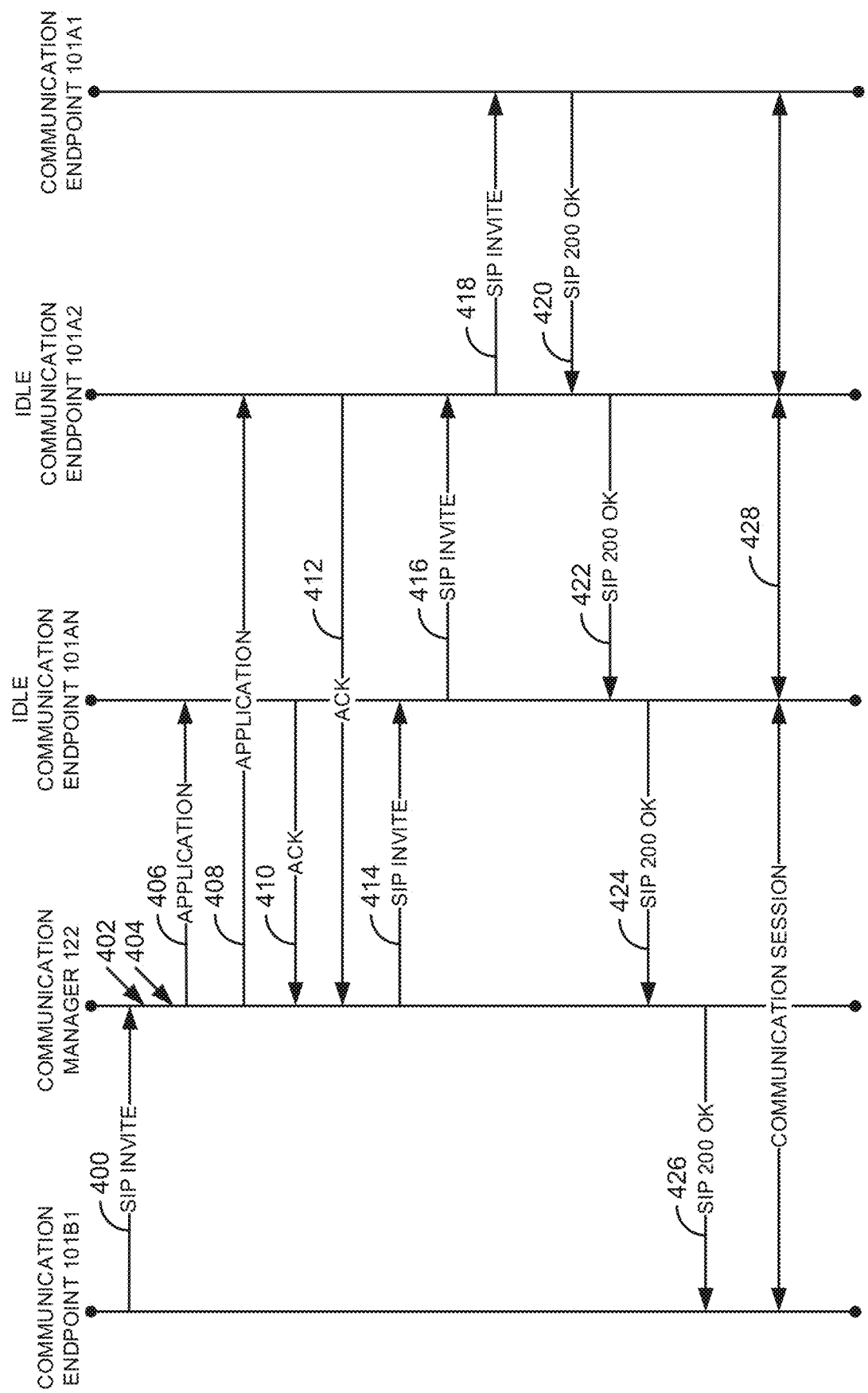
FIG. 4 is a flow diagram of a process for identifying and utilizing idle communication endpoints by inserting multiple applications in multiple idle communication endpoints into a communication session.

The application(s) 124 may be inserted into a communication session in various ways, such as, based on a user profile, based on an administered profile, based on a type of the communication session, based on an event (e.g., the user wants to record a call), and/or the like. The application(s) 124 may be inserted into a signaling channel and/or a media channel of the communication session. Although FIGS. 3 and 4 show the application(s) 124 being inserted into the communication session at the beginning of the communication session, the application(s) 124 may be inserted into the communication session at any time during the duration of the communication session.

The application(s) 124 may be inserted into the communication dynamically based on different factors. For example, if the communication session is a voice or video communication session, the application 124 (e.g., a ring tone generation application 124) is inserted into the communication session. On the other hand, if the communication session is an Instant Messaging (IM) communication session, the ring tone generation application 124 is not inserted into the communication session.

Based on the determination that the application(s) 124 needs to be inserted into the communication session, the idle resource manager 123 selects, in step 304, a processing resource 102 in an idle communication endpoint 101 based on an idleness factor. The idle resource manager 123 may determine the idleness factor of a processing resource 102 in a communication endpoint 101 in various ways. For example, the idle resource manager 123 may query each of the communication endpoints 101A2-101AN (not communication endpoint 101A1 because it will be involved in the communication session) to determine a percentage of idleness of each of the communication endpoints 101A2-101AN. The idle resource manager 123 can be informed by the communication manager 122 of which communication endpoints 101 (e.g., telephones) are involved in communication sessions. Alternatively, the communication endpoints 101A1-101AN may periodically sends their idleness status or send their idleness status based on an event. For example, a telephone may send a message that indicates the telephone just went off-hook and is not idle. The telephone can then send a message that it is idle when the user hangs up.

The idle resource manager 123 may use other idleness factors to determine a projected likelihood that a communication endpoint 101 will be idle. For example, the idle resource manager 123 may determine that the communication endpoint 101 may be idle based on a calendar event of a user of the communication endpoint 101, a usage pattern of the communication endpoint 101 (e.g., never used on the weekend), by identifying that the user of the communication endpoint 101 is away from the communication endpoint 101, by a scanned ID card, by a location of the user of the communion endpoint (e.g., based on a location of the user's cellular telephone), by a location of the communication endpoint 101 (e.g., a lab telephone), based on a login of the user, based on a biometric scan, based on a voice print, based on an activity of the user on another device, based on a usage rate, and/or the like.

Once the idle resource manager 123 has selected a best idle communication endpoint 101 (idle communication endpoint 101AN is this example), the idle resource communication 123 manager sends, in step 306, the application 124 to the idle communication endpoint 101AN. The idle communication endpoint 101AN acknowledges, in step 308, the receipt of the application 124 sent in step 306.

In one embodiment, the sending of the application 124 in step 306 may occur before receiving the SIP INVITE message of step 300. For example, the idle resource manager 123 may send the application 124 to the most idle communication endpoints 101 in anticipation of receiving the SIP INVITE message of step 300. This way, the application 124 is already installed in the idle communication endpoint 101AN, which reduces the time necessary to insert the application 124 into the communication session.

The communication manager 122 sequences the application 124 into the communication session, in step 310, by sending the SIP INVITE message to the idle communication endpoint 101AN. The idle communication endpoint 101AN sends the SIP INVITE message, in step 312, to the communication endpoint 101A1. The communication endpoint 101A1 acknowledges the SIP INVITE message received step 312 by sending a SIP 200 OK message, in step 314, to the idle communication endpoint 101AN. The idle communication endpoint 101AN acknowledges the SIP INVITE message of step 310 by sending a SIP 200 OK message to the communication manager 122 in step 316. The communication manager 122 sends the SIP 200 OK message, in step 318, to the communication endpoint 101B1 to acknowledge the SIP INVITE message of step 300. Although not shown, additional SIP ACK messages will typically be sent to acknowledge the SIP 200 OK messages of steps 314-318.

Steps 300-318 allows the communication session to be setup (i.e., a signaling channel and a media channel (e.g., using Real-Time Communication Protocol) using standard SIP processes, in step 320, between the communication endpoint 101B1, the application 124 in the idle communication endpoint 101AN, and communication endpoint 101A1. For example, the communication session may be a voice communication session where the application 124 in the idle communication endpoint 101AN is an IVR application 124 that allows the user to select different options (e.g., have the call go to voicemail or wait on hold because the user of the communication endpoint 101A1 is temporarily busy).

FIG. 4 is a flow diagram of a process for identifying and utilizing idle communication endpoints 101 by inserting multiple applications 124 in multiple idle communication endpoints 101 into a communication session. The communication endpoint 101B1 sends a SIP INVITE message (a request) to establish a communication session with the communication endpoint 101A1, in step 400. The session manger 120 receives the SIP INVITE message of step 400. The idle resource manager 123 determines, in step 402, if the request to establish the communication session (the SIP INVITE message of step 400) requires applications 124 to be inserted into the communication session between the communication endpoint 101A1 and the communication endpoint 101B1. If there is not an application 124 to be inserted into the communication session or if an idle processing resource 102 is not available, the communication session is established by sending the SIP INVITE message of step 400 to the communication endpoint 101A1 (not shown).

Based on the determination that the applications 124 (two applications 124 in this example, although there could be more than two applications 124 based on implementation) need to be inserted into the communication session, the idle resource manager 123 selects, in step 404, processing resources 102 in the idle communication endpoints 101AN/101A2 based on the idleness factor. The idle resource manager 123 may determine the idleness factor of a processing resource 102 in a similar manner as discussed in FIG. 3.

Once the idle resource manager 123 has selected the best idle communication endpoints 101 (idle communication endpoint 101AN/101A2 is this example), the idle resource communication manager 122 sends, in step 406/408, the application(s) 124 to the idle communication endpoints 101AN/101A2. The application 124 that is sent to the idle communication endpoint 101AN may be the same application 124 or a different application 124. For example, the idle resource manager 123 may send the same recording application 124 to the idle communication endpoints 101AN/101A2. This way, if one of the communication endpoints 101AN/101A2 all of a sudden becomes non-idle (e.g., by going off hook and initiating a communication session) the other communication endpoint 101 will still be able to continue recording the communication session.

Alternatively, the applications 124 may be different. For example, the application 124 send to the idle communication endpoint 101AN may be a ring tone generation application 124 and the application 124 sent to the idle communication endpoint 101A2 may be the call recording application 124.

In one embodiment, the sending of the appellation 124 in steps 406/408 may occur before receiving the SIP INVITE message of step 400. For example, the idle resource manager 123 may send the application(s) 124 to the most idle communication endpoints 101 in anticipation of receiving the SIP INVITE of step 400. This way, the application 124 is already installed in the idle communication endpoint 101AN, which reduces the time necessary to insert the application 124 into the communication session.

The idle communication endpoint 101AN acknowledges, in step 410, the receipt of the application 124 sent in step 406. The idle communication endpoint 101A2 acknowledges, in step 412, the receipt of the application 124 sent in step 408.

The communication manager 122 sequences the application 124 into the communication session, in step 414, by sending the SIP INVITE message to the idle communication endpoint 101AN. The idle communication endpoint 101AN sends the SIP INVITE message, in step 416, to the idle communication endpoint 101A2. The idle communication endpoint 101A2 sends, in step 418, the SIP INVITE message to the communication endpoint 101A1.

The communication endpoint 101A1 acknowledges the SIP INVITE message received in step 418 by sending a SIP 200 OK message, in step 420, to the idle communication endpoint 101A2. The idle communication endpoint 101A2 acknowledges the SIP INVITE message of step 416 by sending a SIP 200 OK message to the idle communication endpoint 101AN in step 422. The idle communication endpoint 101AN sends, in step 424, the SIP 200 OK message to the communication manager 122 to acknowledge the SIP INVITE message of step 414. The communication manager 122 sends, in step 426, the SIP 200 OK message to the communication endpoint 101B1 to acknowledge the SIP INVITE message of step 400. Although not shown, additional SIP ACK messages will typically be sent to acknowledge the SIP 200 OK messages of steps 420-426.

Steps 400-426 allows the communication session to be setup (i.e., a communication channel and a media channel), in step 428, between the communication endpoint 101B1, the application(s) 124 in the idle communication endpoints 101AN/101A2, and the communication endpoint 101A1.

In one embodiment, instead of the applications 124 in the communication endpoints 101 being inserted into the communication session in series as shown in FIG. 4, the applications 124 in the communication endpoints 101 are inserted into the communication session parallel. For example, the communication manager 122 can fork the SIP INVITE of step 414 message (along with the later established media stream) to both the idle communication endpoint 101AN and the idle communication endpoint 101A2.

The processes described in FIGS. 3-4 may be used to setup additional communication sessions. For example, a new communication session (with different endpoints 101) may be established (e.g., at the same time) and use an application(s) 124 in other idle communication endpoint(s) 101.

Figure 5:
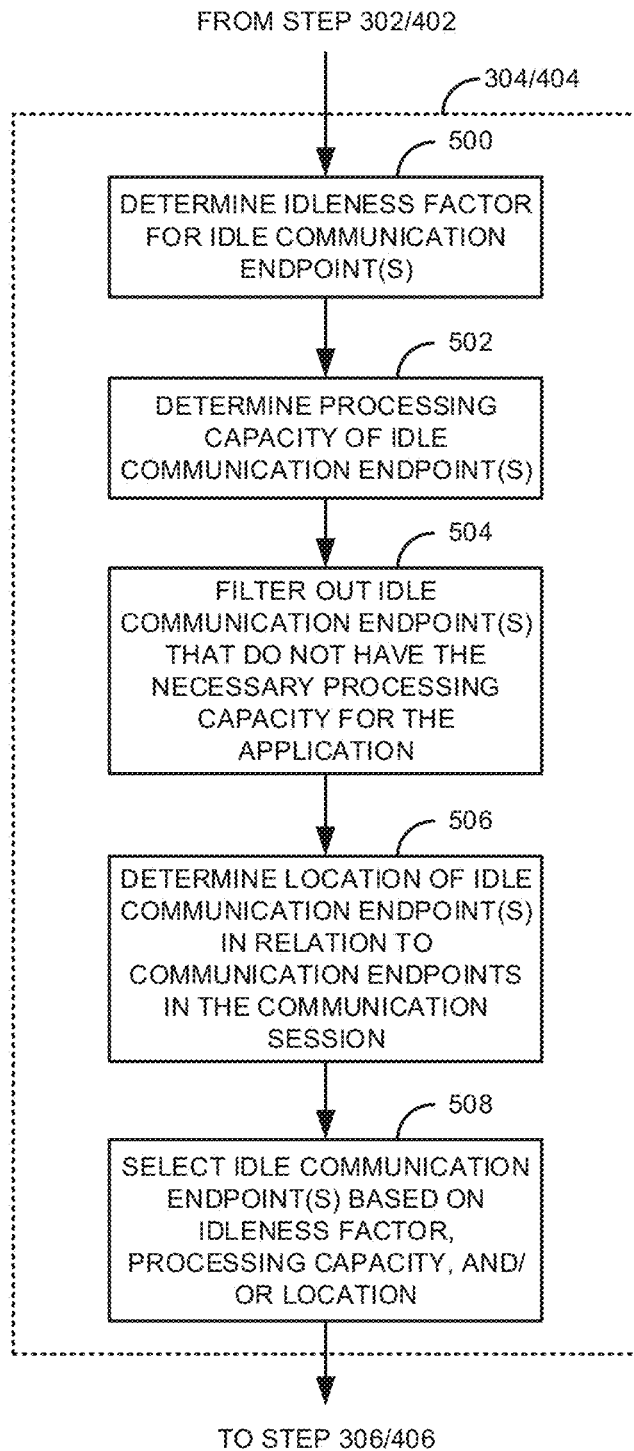
FIG. 5 is a flow diagram of a process for identifying an idle communication endpoint based on idleness, processing capacity, and/or location.

FIG. 5 is a flow diagram of a process for identifying an idle communication endpoint 101 based on idleness, processing capacity, and/or location. FIG. 5 is an exemplary embodiment of step 304/404 of FIGS. 3-4. After determining, in step 302 or 402, that the request to establish the communication requires the application(s) 124 to be inserted into the communication session between the communication endpoint 101A1 and the communication endpoint 101B1, the idle resource manager 123 determines, in step 500, an idleness factor for the communication endpoint(s) 101 (for both idle and non-idle communication endpoints 101). For example, the idleness manager will determine the idleness factor based on the communication endpoints 101 in a branch location 210.

The idleness factor (how likely a communication endpoint 101 may be idle) may be determined in a similar manner as discussed in step 304, such as, based on a calendar event of a user of the communication endpoint 101, a usage pattern of the communication endpoint 101, by identifying that the user of the communication endpoint 101 is away from the communication endpoint 101, by a scanned ID card, based on a login of the user, based on a biometric scan, based on a voice print, based on an activity of the user on another device, based on a usage rate, and/or the like. For example, if the communication endpoints 101A1-101AN comprise one hundred communication endpoints 101A1-101AN, the idle resource manager 123 will determine idleness factors for the communication endpoints 101A1-101AN that are not involved in the communication session (e.g., 99 communication endpoints 101 in this example). If a communication endpoint 101 is a telephone and is currently active in a voice call (or off-hook), the communication endpoint 101 will be typically marked as non-idle.

The idle resource manager 123 determines, in step 502, a processing capacity of the processing resource 102 for the idle communication endpoints 101. The processing capacity of the processing resource 102 may be based on various factors, such as a number of instructions per second of a microprocessor 121/Digital Signaling Processor (DSP), an amount of memory (e.g., to hold and execute the application 124), a number of processor cores, a type of processor (e.g., if the application 124 requires a specific type of processor (e.g., a DSP that uses a specific type of machine code)), and/or the like.

The idle resource manager 123 filters out, in step 504, any idle communication endpoints 101 that do not have the necessary processing capacity for the application 124. For example, if the application 124 requires thirty megabytes of memory, a DSP, and five hundred million instructions per second, all the idle communication endpoints 101 that do not meet this criteria will be filtered out, in step 504, because those communication endpoints 101 are not be capable of executing the application 124.

The idle resource manager 123 determines, in step 506, the location of the idle communication endpoints 101 in relation to the communication endpoints 101 in the communication session. For example, if the communication session is between the communication endpoints 101A1 and 101B1, the idle communication endpoints 101A2-101AN would be closer to the communication endpoint 101A1 involved in the communication session versus other idle communication endpoints 101 that are at a different location (e.g., the idle communication endpoints 101C1-101CN). The purpose of using location is to identify communication endpoints 101 that are close to the communication endpoints 101 involved in the communication session in order to not add additional latency to the communication session. In addition, by using idle communication endpoints 101 that are local, less overall bandwidth may be used. However, the location may only be part of the criteria to select an idle communication endpoint 101. For example, a remote communication endpoint 101 may be given priority over a local communication endpoint 101 because the local communication endpoint is less idle.

Based on steps 500-506, the idle resource manager 123 builds, in step 508, a list of idle/non-idle communication endpoints 101 that are ranked based on the idleness factor, the processing capacity, and/or the location. For example, the list may be similar to Table 1 shown below for the communication session between the communication endpoints 101A1 and 101B1 where the communication endpoints 101A-101N/101C1-101CN are part of the branch networks 210A-210B of a corporation.

The idle communication endpoint 101AN is ranked the highest based on the idleness factor (0.97) and because it is local. Even though the idle communication endpoint 101CN has a higher idleness factor (0.99), it is ranked lower because its location is not local to the communication endpoint 101A1 that is in the communication session. Although the idle communication endpoint 101A2 is local, it is ranked lower than the idle communication endpoint 101C1 because the communication endpoint 101A2 has a much lower idleness factor (0.3) than the communication endpoint 101C1 (0.99).

In one embodiment, the idle resource manager 123 may only use local idle communication endpoints 101. For example, if the communication session is between the communication endpoints 101A1 and 101C1, the idle resource manager 123 in the communication system 120A may create a list based on the communication endpoints 101A2-101AN and the idle resource manager 123 in the communication system 120B may create a list with the communication endpoint 101CN. In this embodiment, each of the idle resource managers 123 in the communication systems 120A-120B may insert one or more applications 124 into the communication session.

Figure 6:
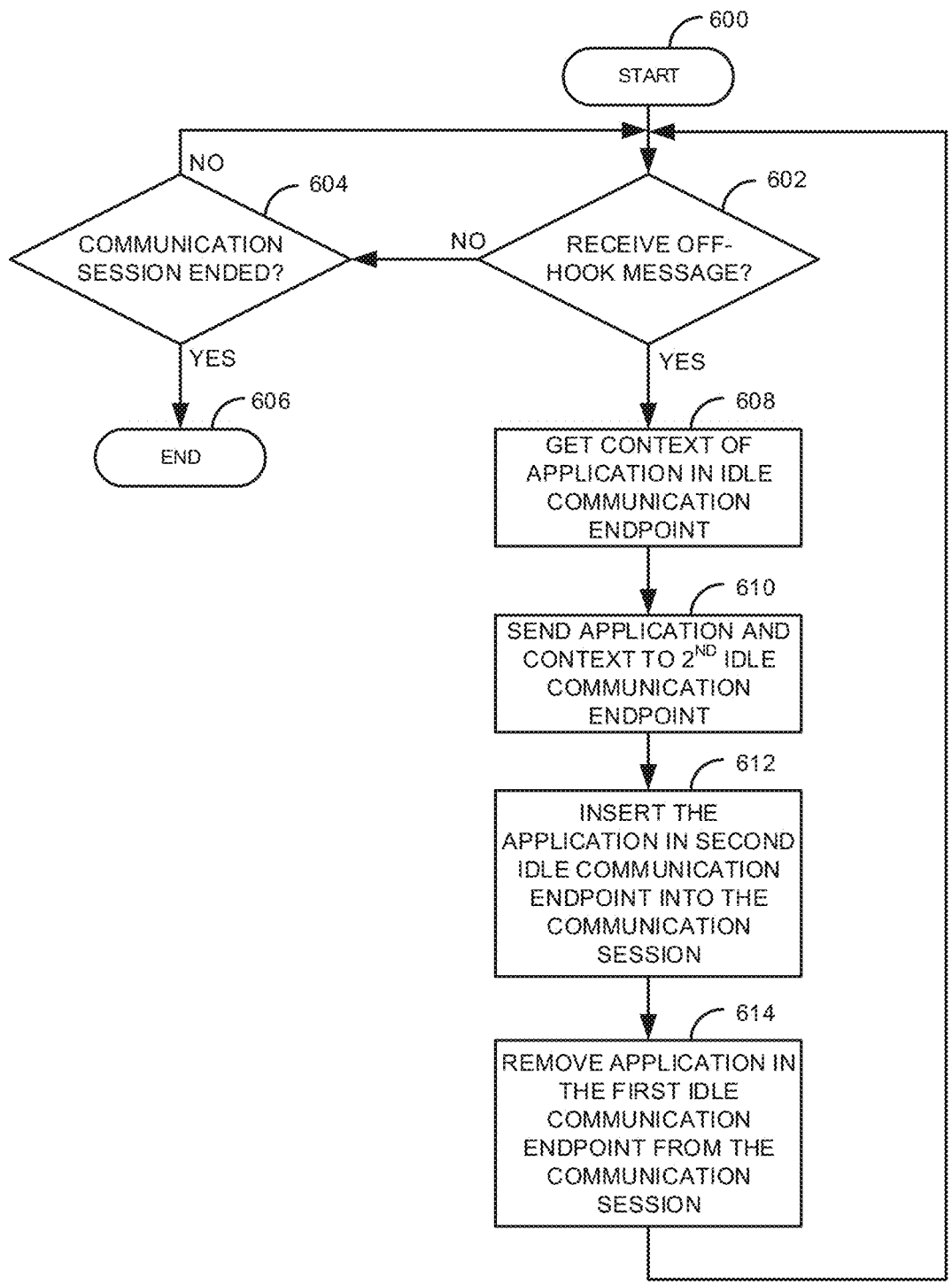
FIG. 6 is a flow diagram of a process for switching an application in a communication session between idle communication endpoints when an off-hook is detected.

FIG. 6 is a flow diagram of a process for switching an application 124 in a communication session between idle communication endpoints 101 when an off-hook is detected (or other event that causes the communication endpoint 101 to no longer be idle). The process of FIG. 6 starts in step 600 after an application(s) 124 in an idle communication endpoint(s) 101 has been inserted into a communication session. For example, as described in FIGS. 3/4 where one or more applications 124 are inserted into a communication session. The idle resource manager 123 determines, in step 602, if an off-hook message (or a message that indicates the idle communication endpoint 101 needs its processing resources 102 back) has been received from the idle communication endpoint 101 with the application 124 that has been inserted into the communication session.

If the off-hook message has not been received in step 602, the idle resource manager 123 determines if the communication session has ended in step 604. If the communication session has ended in step 604, the process ends in step 606.

TABLE 1

| Communication Endpoint | Location (local versus remote) | Idleness Factor | Processing Capacity | Rank |
| --- | --- | --- | --- | --- |
| 101AN | Local | .97 | Meets Criteria | 1 |
| 101C1 | Not Local | .99 | Meets Criteria | 2 |
| 101A2 | Local | .3 | Meets Criteria | 3 |
| 101AD | Local | .99 | Does Not Meets Criteria | Not Available |
| 101CN | Not Local | .00 (Not Idle) | Meets Criteria | Not Available |
| 101A2 | Local | .00 (Not Idle) | Meets Criteria | Not Available |

In Table 1, the ranked order of the idle communication endpoints 101 is: 1) the communication endpoint 101AN, 2) the idle communication endpoint 101C1, and 3) the idle communication endpoint 101A2. Although the idle communication endpoint 101AD is idle and has the highest idleness factor (0.99), the idle communication endpoint 101AD is not available because its processing resources 102 do not meet the necessary criteria (e.g., not enough memory or enough processing power to support the application 124). The communication endpoints 101 101CN and 101A2 are also not available because they are in use (e.g., involved in a voice call).

Otherwise, if the communication session has not ended in step 604, the process goes back to step 602.

If the off-hook message is received in step 602, the idle resource manager 123 gets, in step 608, the context of the application 124 (if the application 124 has a context) in the idle communication endpoint 101. For example, if the application 124 is an IVR application 124 that is currently playing a message in the communication session, the context (the context may be sent in the off-hook message of step 602) may indicate at what point the message is being played when the off-hook occurs. If the application 124 is a recording application 124, the context can include the recorded communication session up to the time of the off-hook message of step 602.

The idle resource manager 123 sends, in step 610, the application 124 and the context (e.g., the point of the message in the IVR application 124) to a second idle communication endpoint 101. Alternatively, the application 124 may have already been sent previously (e.g., as part of step 306) to the second idle communication endpoint 101. In this embodiment, only the context (if there is any) is sent in step 610. The application 124 in the second idle communication endpoint 101 is then inserted into the communication session in step 612. The first application 124 in the first idle communication endpoint 101 (which is no longer idle) is removed from the communication session in step 614 and the process goes to step 602.

For example, if the application is a recording application 124, the recording application in the second idle communication endpoint can continue the recording of the communication session. Since the idle resource manager 123 has both sections (or has access to both sections) of the recorded communication session, the idle resource manager 123 can provide the whole recorded communication session to a user.

Figure 7:
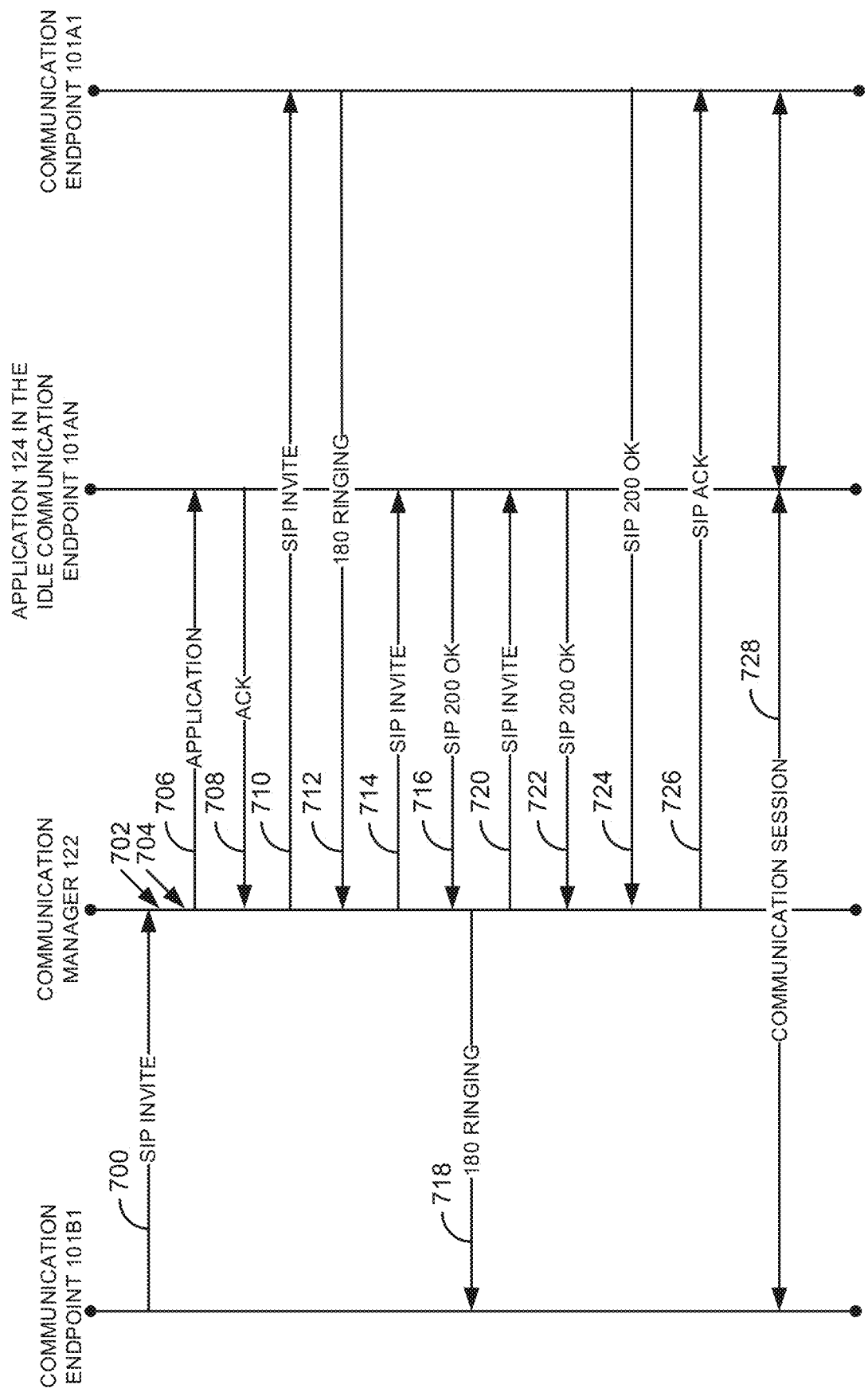
FIG. 7 is a flow diagram of a process for identifying and utilizing idle communication endpoints by inserting an application in an idle communication endpoint into a communication session.

FIG. 7 is a flow diagram of a process for identifying and utilizing idle communication endpoints 101 by inserting an application in an idle communication endpoint 101 into a communication session. FIG. 7 is an exemplary example that uses SIP to establish the communication session. However, one of skill in the art would recognize that other protocols (e.g., Web Real-Time Communication (Web RTC) protocol, H.323, video protocols, etc.) may be used. The process of FIG. 7 is where there is not a media server 140 or where the media server 140 has failed.

The communication endpoint 101B1 sends a SIP INVITE message (a request) to establish a communication session with the communication endpoint 101A1, in step 700. The communication manger 122 receives the SIP INVITE message of step 700. The idle resource manager 123 determines, in step 702, if the request to establish the communication session (the SIP INVITE message of step 700) requires an application 124 to be inserted into the communication session between the communication endpoint 101A1 and the communication endpoint 101B1. In step 702, the determination may that there is always an application 124 to be inserted into the communication session. If there is not an application 124 to be inserted into the communication session or if an idle processing resource 102 is not available, the communication session is established by sending the SIP INVITE message of step 700 directly to the communication endpoint 101A1 (not shown).

The application(s) 124 may be inserted into a communication session in various ways, such as, based on a user profile, based on an administered profile, based on a type of the communication session, based on an event (e.g., the user wants to record a call), and/or the like. The application(s) 124 may be inserted into a signaling channel and/or a media channel of the communication session (e.g., the voice stream of a call). Although FIG. 7 shows the application(s) 124 being inserted into the communication session at the beginning of the communication session, the application(s) 124 may be inserted into the communication session at any time during the duration of the communication session.

The application(s) 124 may be inserted into the communication dynamically based on different factors. For example, if the communication session is a voice or video communication session, the application 124 (e.g., a ring tone generation application 124) is inserted into the communication session. On the other hand, if the communication session is an Instant Messaging (IM) communication session, the ring tone generation application 124 is not inserted into the communication session.

Based on the determination that the application(s) 124 needs to be inserted into the communication session, the idle resource manager 123 selects, in step 704, a processing resource 102 in an idle communication endpoint 101 based on an idleness factor. The idle resource manager 123 may determine the idleness factor of a processing resource 102 in a communication endpoint 101 in various ways (e.g., like those described in FIG. 3).

Once the idle resource manager 123 has selected a best idle communication endpoint 101 (idle communication endpoint 101AN is this example), the idle resource communication 123 manager sends, in step 706, the application 124 to the idle communication endpoint 101AN. The idle communication endpoint 101AN acknowledges, in step 708, the receipt of the application 124 sent in step 706.

In one embodiment, the sending of the appellation 124 in step 706 may occur before receiving the SIP INVITE message of step 700. For example, the idle resource manager 123 may send the application 124 to the most idle communication endpoints 101 in anticipation of receiving the SIP INVITE message of step 700. This way, the application 124 is already installed in the idle communication endpoint 101AN, which reduces the time necessary to insert the application 124 into the communication session.

The communication manager 122 sends the SIP INVITE message of step 700 to the communication endpoint 101A1 in step 710. The communication endpoint 101A1 sends, in step 712, a SIP RINGING message to the communication manager 122. The communication manager 122 sends, in step 714, a SIP INVITE message that includes Session Description Protocol (SDP) information (e.g., a codec) for the communication endpoint 101B1 to the communication endpoint 101AN. The communication endpoint 101AN sends, in step 716, a SIP 200 OK message that includes SDP information (e.g., a codec) for the communication endpoint 101AN.

The communication manager 122 sends, a SIP 180 RINGING message, in step 718, to the communication endpoint 101B1 with the SDP information of the communication endpoint 101AN. This allows a Real-Time Protocol (RTP) ring-back message to be played to the communication endpoint 101B1.

The communication manager 122 sends, in step 720 a SIP INVITE message with the SDP information from the communication endpoint 101A1 to the communication endpoint 101AN. The communication endpoint 101AN sends, in step 722, a SIP 200 OK message. The communication endpoint 101A1 sends, in step 724, a SIP 200 OK for the original SIP INVITE of step 710 (e.g., when a user answers). The communication manager 122 sends, in step 726, a SIP ACK message to the communication endpoint 101A1. This allows a communication session (e.g., a media session (e.g., a voice call)) to be established in step 728 between the communication endpoints 101A1, 101B1, and 101AN.

In a peer-to-peer environment, the communication system 120/communication manager may not be used. In this example, the communication endpoint 101B1 would determine which communication endpoints 101 are idle by sending out a broadcast message. The communication session would be established directly with the communication endpoint 101A1. In addition, a communication session would be established between the communication endpoint 101B1 and 101AN.

Figure 8:
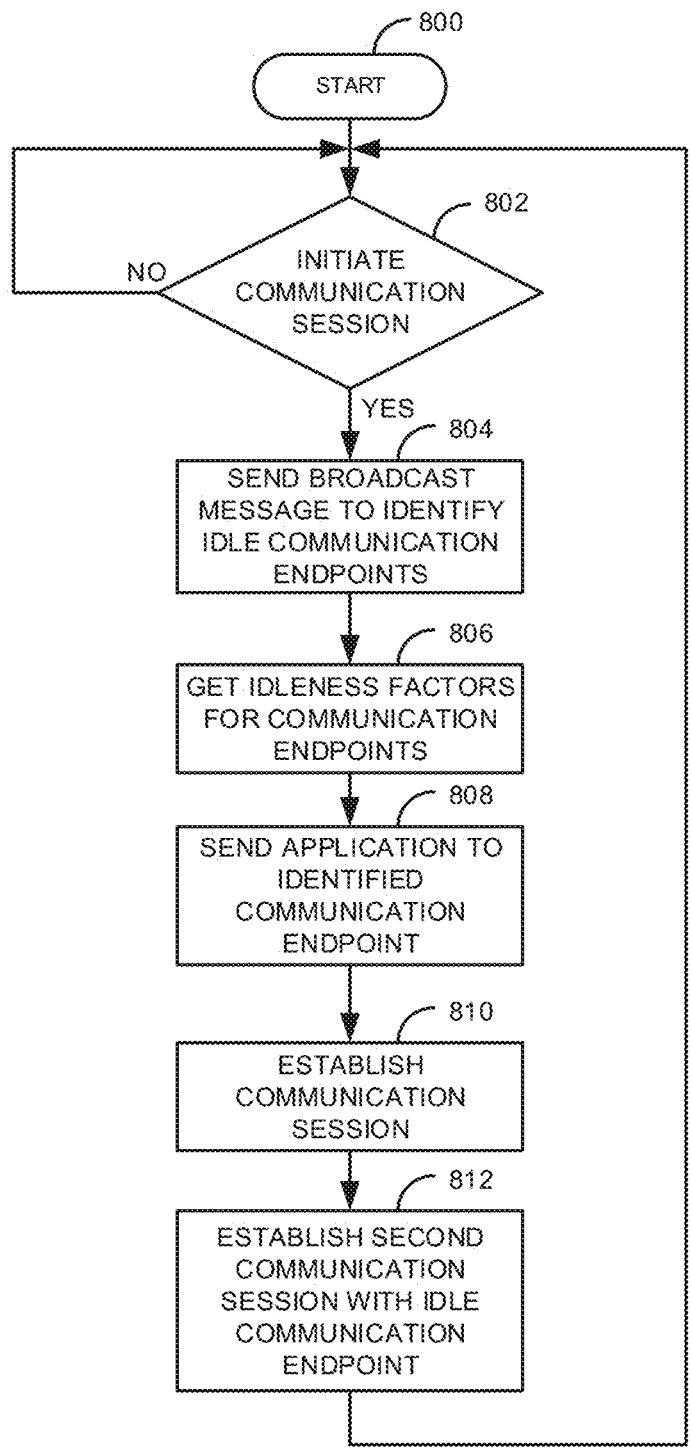
FIG. 8 is a flow diagram of a process for identifying idle communication endpoints in a peer-to-peer environment.

FIG. 8 is a flow diagram of a process for identifying idle communication endpoints in a peer-to-peer environment. The process starts in step 800. The communication endpoint 101A1 determines, in step 802, if there is an attempt to initiate a communication with a second communication endpoint (e.g., communication endpoint 101B1). If there is not an attempt to initiate a communication session in step 802, the process of step 802 repeats.

If there is a request to initiate a communication session in step 802, the communication endpoint 101A sends, in step 804, a broadcast message to other communication endpoints 101 to determine an idleness factor. The broadcast message of step 804 is only sent if an application 124 is needed. If there is not an application 124 to be used, the process just establishes the communication session in standard fashion. The communication endpoint 101A1 receives the idleness factors from the other communication endpoints 101 in step 806. The communication endpoint 101 with the best idleness factor is identified in step 808 and the application 124 is sent to the identified communication endpoint 101 in step 808.

The communication endpoint 101A1 establishes the communication session with the second communication endpoint 101B1 in step 810. The communication endpoint 101A1 also establishes a communication session with the communication the communication endpoint 101 with the best idleness factor in step 812. For example, an audio stream may be sent to the communication endpoint 101 with the best idleness factor to record the audio stream of the communication session between the communication endpoint 101A1 and 101B1. The process then goes back to step 802.

In one embodiment, a communication session may be established in a similar manner as discussed in FIG. 7 where the best idle communication endpoint is inserted into the communication session.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network 110, such as a LAN and/or the Internet, or within a dedicated system. Thus, it should be appreciated, that the components of the system can be combined in to one or more devices or collocated on a particular node of a distributed network 110, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server 140, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor 121 or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors 121), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor 121 or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor 121, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   receiving, by a microprocessor of a computer network, a request to establish a communication session between a first communication endpoint and a second communication endpoint;
   determining, by the microprocessor, that the request to establish the communication session between the first communication endpoint and the second communication endpoint will include an application to be inserted into the communication session between the first communication endpoint and the second communication endpoint;
   selecting, by the microprocessor, a first processing resource in a first idle communication endpoint based on an idleness factor of the first processing resource;
   sending, by the microprocessor, the application to the first idle communication endpoint; and
   sending, by the microprocessor, a request to include the first idle communication endpoint into the communication session between the first communication endpoint and the second communication endpoint,
   wherein the application in the first idle communication endpoint is inserted into the communication session between the first communication endpoint and the second communication endpoint, and
   wherein the first idle communication endpoint, the first communication endpoint and the second communication endpoint are not computer network elements that relay the communication session in the computer network.

2. The method of claim 1, wherein the idleness factor of the first processing resource comprises a plurality of idleness factors of a plurality of processing resources in a plurality of idle communication endpoints and further comprising:
   sending, by the microprocessor, the application to a second idle communication endpoint of the plurality of idle communication endpoints, wherein the application in the second idle communication endpoint is also inserted into the communication session between the first communication endpoint and the second communication endpoint.

3. The method of claim 2, wherein the application in the first idle communication endpoint and the second idle communication endpoint are the same application.

4. The method of claim 2, wherein the application in the first idle communication endpoint and the second idle communication endpoint are inserted in series in the communication session.

5. The method of claim 2, wherein the application in the first idle communication endpoint and the second idle communication endpoint are two different applications.

6. The method of claim 1, wherein the idleness factor comprises a plurality of idleness factors of a plurality of processing resources in a plurality of idle communication endpoints and further comprising:
   receiving, by the microprocessor, a message indicating that the first idle communication endpoint has gone off hook; and
   sending, by the microprocessor, the application to a second idle communication endpoint of the plurality of idle communication endpoints, wherein the application in the second idle communication endpoint is also inserted into the communication session between the first communication endpoint and the second communication endpoint.

7. The method of claim 6, wherein the application sends and/or records one or more voice streams to and/or from at least one of the first communication endpoint and the second communication endpoint and wherein the application in the second idle communication endpoint picks up sending and/or recording the one or more voice streams after the first idle communication endpoint goes off hook.

8. The method of claim 6, wherein in response to the first idle communication endpoint going off hook, the first processing resource in the first idle communication endpoint is removed from the communication session.

9. The method of claim 1, wherein selecting the first processing resource in the first idle communication endpoint occurs because a media server that normally inserts the application into the communication session has failed.

10. The method of claim 1, further comprising:
determining a first processing capacity of the first processing resource, wherein selecting the first processing resource in the first idle communication endpoint is also based on the determined first processing capacity of the first processing resource.

11. The method of claim 1, further comprising:
determining a location of the first idle communication endpoint, wherein selecting the first processing resource in the first idle communication endpoint is also based on the first idle communication endpoint being in a same location as at least the first communication endpoint or the second communication endpoint.

12. The method of claim 1, wherein the idleness factor is based on at least one of a calendar event of a user of the first idle communication endpoint, a usage pattern of the first idle communication endpoint, identifying that the user of the first idle communication endpoint is away from the first idle communication endpoint, a scanned ID card, a location of the user of the first idle communion endpoint, a location of the first idle communication endpoint, a login of the user, a biometric scan, a voice print, and activity on another device.

13. A system, comprising:
a microprocessor of a computer network; and
a computer readable medium, coupled with the microprocessor and comprising microprocessor readable and executable instructions that program the microprocessor to:
receive a request to establish a communication session between a first communication endpoint and a second communication endpoint;
determine that the request to establish the communication session between the first communication endpoint and the second communication endpoint requires an application to be inserted into the communication session between the first communication endpoint and the second communication endpoint;
select a first processing resource in a first idle communication endpoint based on an idleness factor of the first processing resource;
send the application to the first idle communication endpoint; and
send a request to include the first idle communication endpoint into the communication session between the first communication endpoint and the second communication endpoint,
wherein the application in the first idle communication endpoint is inserted into the communication session between the first communication endpoint and the second communication endpoint, and
wherein the first idle communication endpoint, the first communication endpoint, and the second communication endpoint are not computer network elements that relay the communication session in the computer network.

14. The system of claim 13, wherein the idleness factor of the first processing resource comprises a plurality of idleness factors of a plurality of processing resources in a plurality of idle communication endpoints and wherein the microprocessor readable and executable instructions further program the microprocessor to:
send the application to a second idle communication endpoint of the plurality of idle communication endpoints, wherein the application in the second idle communication endpoint is also inserted into the communication session between the first communication endpoint and the second communication endpoint.

15. The system of claim 14, wherein the application in the first idle communication endpoint and the second idle communication endpoint are the same application and wherein the application in the first idle communication endpoint and the second idle communication endpoint is inserted in series in the communication session.

16. The system of claim 13, wherein the idleness factor comprises a plurality of idleness factors of a plurality of processing resources in a plurality of idle communication endpoints and wherein the microprocessor readable and executable instructions further program the microprocessor to:
receive a message indicating that the first idle communication endpoint has gone off hook; and
send the application to a second idle communication endpoint of the plurality of idle communication endpoints, wherein the application in the second idle communication endpoint is also inserted into the communication session between the first communication endpoint and the second communication endpoint.

17. The system of claim 16, wherein the application sends and/or records one or more voice streams to and/or from at least one of the first communication endpoint and the second communication endpoint and wherein the application in the second idle communication endpoint picks up sending and/or recording the one or more voice streams after the first idle communication endpoint goes off hook.

18. The system of claim 13, further comprising:
determining a first processing capacity of the first processing resource, wherein selecting the first processing resource in the first idle communication endpoint is also based on the determined first processing capacity of the first processing resource.

19. The system of claim 13, wherein the microprocessor readable and executable instructions further program the microprocessor to:
determine a location of the first idle communication endpoint, wherein selecting the first processing resource in the first idle communication endpoint is also based on the first idle communication endpoint being in a same location as at least the first communication endpoint or the second communication endpoint.

* * * * *